March 25, 1947. M. MOONEY 2,417,988
APPARATUS FOR MEASURING SURFACE ROUGHNESS
Filed June 30, 1945

INVENTOR.
MELVIN MOONEY
BY
Lester J. Dudley
ATTORNEY

Patented Mar. 25, 1947

2,417,988

UNITED STATES PATENT OFFICE 2,417,988

APPARATUS FOR MEASURING SURFACE ROUGHNESS

Melvin Mooney, Lake Hiawatha, N. J., assignor to United States Rubber Company, New York, N. Y., a corporation of New Jersey Application June 30, 1945, Serial No. 602,497

4 Claims. (Cl. 73—37)

This invention relates to an apparatus for obtaining a quantitative measure of the roughness, or rugosity, of a surface. The apparatus herein described will be referred to as a rugosimeter.

In the manufacture of articles from natural or synthetic rubber the roughness of the surface obtained following calendering operations is an important criterion in determining the suitability of a given stock for certain applications. Thus, a calendered stock which would be smooth enough for the manufacture of tires might be much too rough to be used in the manufacture of waterproof footwear. In the past it has been necessary to rely upon the individual judgment of skilled operators as to the relative roughness of rubber stocks. It is an object of this invention to provide a means of obtaining objective measurements of the roughness, or rugosity, of surfaces such as those of calendered natural or synthetic rubber, which will be free of the uncertainties associated with subjective observations. It is also an object of this invention to provide an apparatus which will have essentially the same sensitivity over the wide range of rugosity values encountered in the manufacture of rubber articles.

The term "rugosity" as used herein is a technical term for surface roughness. Consider an idealized surface which is sinusoidal in profile. Then the height of the hills above the valleys is called the "rugosity height." For a real surface, generally not sinusoidal, its rugosity height is taken to be the height of a sinusoidal surface which would give the same measurement in this rugosity test. The measurement made is essentially the resistance to flow of air between the rough surface and a smooth surface resting on top of it.

The invention is particularly described in reference to the accompanying drawings, in which.

Figure 1:
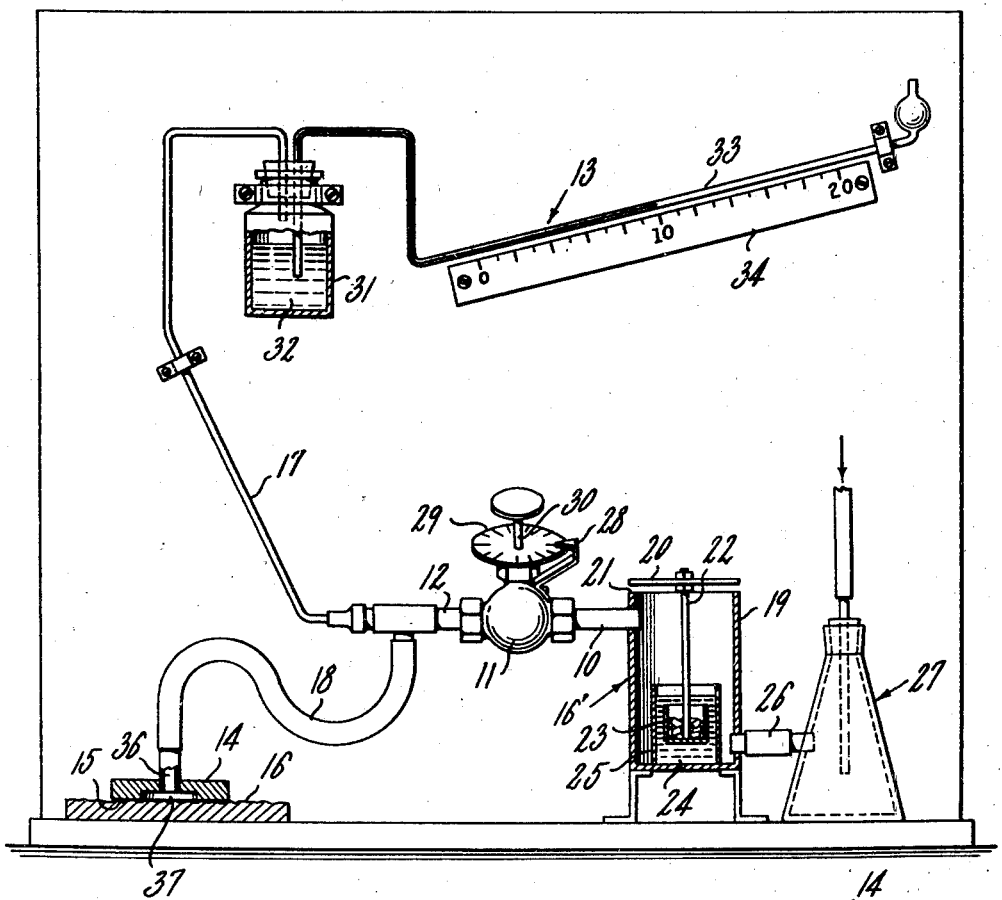
Fig. 1 is an elevational view of an apparatus embodying the invention, parts of which are shown in cross section.
Figure 2:
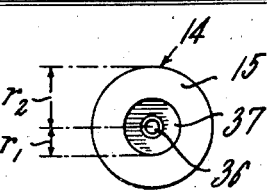
Fig. 2 is a plan view of the bottom face of a contact plate which constitutes the smooth surface resting on top of the rough surface to be tested as shown in Fig. 1.

In the operation of the device shown in Figs. 1 and 2, air or other gas under a small superatmospheric pressure is supplied to the inlet 10 of a continuously adjustable aerodynamic resistance 11, the outlet 12 of which communicates with a pressure indicating device 13 and with a contact plate 14 so constructed that the gas in escaping must pass between the smooth surface 15 of the plate and the surface 16 of the test sample, whose rugosity is to be measured. The phrase "superatmospheric pressure" as used herein indicates the difference between atmospheric pressure and some pressure higher than atmospheric and as so used it is equivalent to what is often referred to as positive gauge pressure.

Under the test conditions the following relation will be true:

$$R_x = R_v \frac{P_x - P_a}{P_0 - P_x} \qquad (1)$$

where $R_x$ = the resistance offered to the flow of gas between the smooth surface of the contact plate and the surface whose rugosity is to be determined;

$R_v$ = the resistance offered by the adjustable aerodynamic resistance to the flow of gas through it;

$P_0$ = absolute pressure of gas supplied to the adjustable resistance;

$P_x$ = absolute pressure of gas at outlet of adjustable resistance; and $P_a$ = atmospheric pressure.

As shown by the above equation the aerodynamic resistance $R_x$ of the passage or passages between the contact plate 14 and the surface 16 (which is an inverse measure of the rugosity of the surface) is directly proportional to the observed value $R_v$ of the aerodynamic resistance 11 when the ratio between the pressure drop $(P_x - P_a)$ across the test sample and the pressure drop $(P_0 - P_x)$ across the variable resistance is constant. Accordingly my apparatus is provided with means for establishing any selected ratio between such pressure differences, and means for indicating the relative value of the continuously adjustable aerodynamic resistance corresponding to the selected ratio. Under the test conditions, when the pressures corresponding to the selected ratio are established, the observed value of the resistance 11 will be a measure of the rugosity of the surface 16. The indicator, i. e., the dial or scale, of the variable resistance may be calibrated to indicate standard rugosity values as will hereinafter be explained.

Again referring to the equation (1), when $P_x - P_a$ is made equal to $\frac{1}{2}(P_0 - P_a)$, then $$\frac{P_x - P_a}{P_0 - P_x}$$

becomes equal to unity, and $R_x = R_v$, that is, the resistance offered to the flow of gas between the contact plate and the surface whose rugosity is being measured is equal to the resistance value of the adjustable resistance. This is the most convenient condition under which to use the apparatus, but other ratios between the pressure drops may be used.

Fig. 1 is an elevational view of one form of the apparatus which comprises a means, such as a pressure regulator 16′, for supplying gas at constant super-atmospheric pressure to the adjustable aerodynamic resistance 11, a pressure indicating device 13, and a contact plate 14 communicating with each other and with the outlet 12 of the aerodynamic resistance 11 by means of conduits 17 and 18.

The pressure regulator 16′ comprises a cylindrical container 19 having a float valve 20 for cooperating with its upper edge 21 as a valve seat. The valve 20 is provided with a rod 22 which has a cup 23 attached to its lower end and immersed in a liquid 24 contained in dash pot 25. The valve 20 may be weighted by depositing weights in the cup 23 so that the valve can be made to maintain the pressure within regulator 16′ at any desired superatmospheric pressure.

The pressure regulator 16′ is connected by conduit 26 to a source of air or other gas at a pressure above that which is to be maintained in the regulator 16′. As a precaution to prevent the intrusion of foreign matter into the control valve which constitutes the aerodynamic resistance 11, the gas supply line may be provided with a trap 27. The air pressure regulator 16′ is connected by conduit 10 to the inlet of the adjustable aerodynamic resistance 11.

The adjustable aerodynamic or air flow resistance 11 comprises a standard needle valve which is provided with a fixed pointer 28 and a graduated scale 29 attached to and movable with the manually rotatable shaft 30 of the needle valve.

The outlet of the needle valve is connected by tube 17 to the pressure indicating device 13 which is a conventional manometer, one leg of which consists of a reservoir 31 filled with a manometer liquid 32 which in the present apparatus is a light machine oil, and the other leg of which is an inclined tube 33 provided with a graduated scale 34.

Figure 2 is a bottom face view of contact plate 14 which is a flat metal cylinder having a central orifice 36 communication with conduit 18 and a cylindrical central cavity 37 having a radius $r_1$ surrounded by an annular ridge 15 having an inner radius $r_1$ and an outer radius $r_2$ and having a smooth planar lower surface. When used in the determination of rugosity the contact plate 14 is placed with its lower surface 15 resting on the surface 16 of the sample to be tested so that the air flowing out from cavity 37 must pass between the plate surface 15 and sample surface 16.

In my apparatus it is essential to provide means for comparing the pressure drop across the aerodynamic resistance 11 with the pressure drop between the outlet 12 and the atmosphere and means for establishing a selected ratio between these two pressure drops. In the apparatus shown in Fig. 1, the pressure at the inlet to the resistance is maintained constant and the manometer 13 is used to measure the supply pressure $P_0$ and the pressure at the outlet 12. Under such conditions any selected readings of the pressures $P_0$ and $P_x$ on the manometer provide the essential comparison.

The preferred adjustments of the manometer 13 and the pressure regulator 16′ are such that the manometer reading corresponding to the pressure $P_0$ comes at a predetermined convenient point on the manometer scale. To secure this adjustment, the liquid level in the manometer 13 is first adjusted to coincide with a point selected as the zero reading on scale 34 when the air pressure is off and orifice 36 in contact plate 14 is open to the atmosphere. The air pressure is then turned on, valve 11 is opened wide, and opening 36 is closed with a suitable stopper. The pressure regulator 16′ is then adjusted by adding to or taking weights out of cup 23 until the liquid level in manometer 13 coincides with a point selected as the upper index on scale 34. Since arm 33 is tilted and the manometer liquid is a light machine oil, the total superatmospheric pressure for a reading of 20 cm. on scale 34 will be between 1 and 2 mm. of mercury. The stopper is then removed from opening 36 and the measurement of the relative rugosity is carried out by placing the sample 16 on a flat glass plate, or other smooth hard surface, and placing the contact plate 14 on the top surface of the sample. The valve 11 is then adjusted until the liquid level in the manometer 13 stands at the midpoint between the lower and the upper index mark on the scale 34. Thus the midpoint will be 10 when the lower and upper indices are zero and 20, respectively. Readings of the needle valve scale 29, for various samples, will indicate the relative rugosity of the several samples. The sample giving a valve scale reading indicating the greatest valve opening will have the greatest rugosity and of course the rugosity of the samples diminishes in proportion as the observed valve openings diminish.

To convert the needle valve positions as indicated by the graduated scale 29 and pointer 28 into corresponding standard rugosity values, it is necessary to calibrate the apparatus against known standards. For that purpose a series of capillary tubes of known dimensions are substituted one after another for the unknown aerodynamic resistance $R_x$, by connecting such tube to conduit 18 in place of the contact plate 14. The valve 11 is turned until the manometer reading is at the midway point 10, and the reading on the valve scale 29 is noted. The true rugosity heights which may be calculated for the test plate to be used by the formula hereinafter given, may be noted directly on the valve scale 29, or the valve scale may be graduated in any arbitrary units, and in the latter case a calibration curve is prepared by plotting the valve settings for the tubes against the calculated rugosity heights. The calibration curve through these points is almost linear, indicating that the sensitivity of the apparatus is essentially constant over a wide range of rugosity values.

The rugosity value corresponding to the valve setting for which $P_x - P_a = \frac{1}{2}(P_0 - P_a)$ when a capillary tube is substituted for a given contact plate may be calculated from the following equation:

$$h = \sqrt[3]{\frac{24 r_0^4}{5L} \ln \frac{r_2}{r_1}}$$

where $h$ = rugosity value,
$r_2$ = outer radius of annular contact surface 15 of contact plate 14, $r_1$ = inner radius of annular contact surface 15 of contact plate 14,
$r_0$ = radius of capillary
$L$ = length of capillary.

For instance, when the inner and outer radii of the planar surface of the contact plate 14 are 4.0 cm. and 9.0 cm., respectively, and five capillary tubes each having a length of 20 cm. and having internal radii of .04 cm., .08 cm., .16 cm., .24 cm., and .32 cm., respectively, are used for standardization, it is found that these capillaries are equivalent to surfaces having rugosity heights of .00792 cm., 0.0200 cm., .0503 cm., .0864 cm., and .1270 cm. respectively.

Commercial calendered rubber stocks commonly have rugosity heights below .08 cm.; those with rugosity heights above .02 cm. are considered too rough for footwear, while stocks having rugosity heights above .05 cm. are considered too rough for tire stocks.

It has been proposed heretofore to measure the rugosity of surfaces by supplying air at constant pressure to a fixed aerodynamical resistance represented by a capillary tube and thence to an annular contact plate so constructed that the gas in escaping must pass between its smooth surface and the surface of the sample to be tested. The resistance to the flow of air between the contact plate and the sample is determined by measuring the pressure drop between the source of air at constant pressure and the contact plate. The difficulty with such an apparatus is that its sensitivity varies widely over the range of rugosity or roughness encountered in rubber practice. Therefore, the accuracy of the rugosity values thus obtained varies considerably throughout the range of rugosity encountered in the practice of measuring the roughness of rubber surfaces. I have found however, that by using a continuously variable aerodynamic resistance such as a needle valve in place of the fixed resistance used in the prior art and by adjusting said needle valve so that its resistance to the flow of air or gas therethrough is made directly proportional to the resistance to the flow of air between the contact plate and the sample, accurate rugosity values can be obtained over a wide range.

Figure 3:
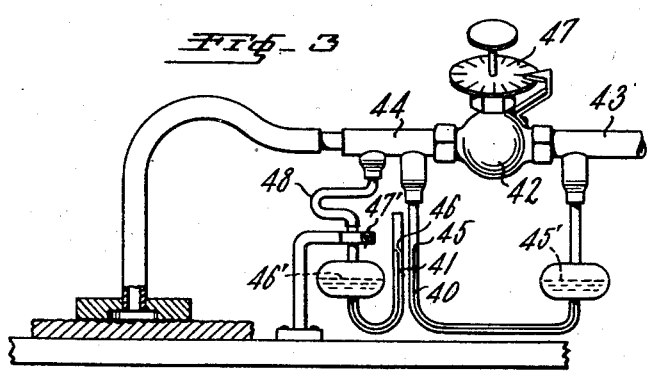
Fig. 3 is an illustration of another form of the invention.

The second form of the invention, shown in Fig. 3 of the drawings, has a further advantage over rugosimeters heretofore used in that it does not require the maintenance of a precisely uniform or constant supply pressure at the inlet to the aerodynamic resistance, because it provides the necessary comparison between the pressure differences across the two resistances without determination of any manometer scale readings and without reference to any fixed points on the manometer tubes, even though the supply pressure fluctuates somewhat. Accordingly, in this device the pressure regulator in the supply line may be eliminated, provided that a throttling or pressure-reducing valve is put in the supply line so as to provide a fairly steady gas pressure within the range of the manometer used.

The rugosimeter shown in Fig. 3 works on the same principle as that disclosed in Fig. 1. The structural difference is that manometers 40 and 41 are employed for comparing the pressure drops in place of manometer 13 disclosed in Fig. 1. The manometer 40 is connected across the aerodynamic resistance valve 42 and the difference in levels of the liquid therein indicates the drop in pressure between the inlet 43 and the outlet 44 of the valve. The manometer 41 has one arm connected to the outlet 44, and the other arm is open to the atmosphere, so that the difference in liquid level in the arms indicates the drop in pressure between the outlet and the atmosphere. With the arrangement of the tubes as shown, the drop in pressure across the valve 42 is indicated by the liquid level 45 in the tube 40, and the pressure in the outlet 44 is indicated by the liquid level 46 in the tube 41, and the respective pressures can be thus compared either by the relative positions of the two levels or by reference to graduations on the tubes. For convenience the manometers are so constructed and adjusted that the liquid levels 45, 45', 46 and 46' in the two manometers are at the same level when the pressure differences are zero and the apparatus is open to the atmosphere. This is done by moving the manometer 41, up or down and clamping it in position with the clamp 47'. The flexible tube 48 will permit the movement. As previously stated the most convenient ratio of pressure drops to be used in carrying out the test is unity, a condition obtained when the drop in pressure across the valve 42 equals the drop in pressure from the outlet 44 to the atmosphere. When such condition is obtained the liquid levels 45 and 46 of the respective manometers are at the same level, thus affording a convenient criterion of the condition sought. The relative rugosities of several samples to be tested are indicated by the valve scale 47 when it is so adjusted that the liquid levels 45 and 46 are the same. In the event it is desired to calibrate the valve scale 47 to standard rugosity values it can be done with the use of the capillary tubes in the same manner as described in reference to Fig. 1.

Although the above invention has been described as adapted to the measurement of the roughness of approximately plane surfaces it should be apparent that by suitably modifying the shape of the contact plate the apparatus can be used to measure the roughness of approximately cylindrical or other curved surfaces. In such cases the shape of the smooth surface of the contact plate should be designed to conform to the superficial outline of the surface to be tested.

It should also be apparent that the advantages which accrue from the use in my rugosimeter of a continuously adjustable aerodynamic resistance in place of the fixed resistance used heretofore can be obtained in other modifications which fall within the broad scope of my invention as indicated by the appended claims.

Having thus described my invention, what I claim and desire to protect by Letters Patent is:

1. A rugosimeter comprising a conduit, a contact plate, a continuously adjustable aerodynamic resistance within the conduit, means for supplying gas at superatmospheric pressure to the inlet of the conduit, the outlet of the conduit being connected to the contact plate adapted to be maintained in contact with the surface to be tested in such a way that the gas in escaping from the conduit must pass between the smooth surface of said plate and the surface to be tested, means for indicating the relative resistance value of said adjustable aerodynamic resistance, and means for comparing the gas pressure drop across said aerodynamic resistance with the gas pressure drop across the test sample.

2. A rugosimeter comprising a conduit, a contact plate, a continuously adjustable aerodynamic resistance within the conduit, means for supplying gas at superatmospheric pressure to the inlet of said conduit, the outlet of said conduit being connected to the contact plate adapted to be maintained in contact with the surface to be tested in such a way that the gas in escaping from said conduit must pass between the smooth surface of said plate and the surface to be tested, means for indicating the relative resistance value of said adjustable aerodynamic resistance, and means for indicating a selected ratio between the gas pressure drop across said aerodynamic resistance and the gas pressure drop from the outlet of said conduit to the atmosphere.

3. A rugosimeter comprising a conduit, a contact plate, a continuously adjustable aerodynamic resistance within the conduit, means for supplying gas at a known constant superatmospheric pressure to the inlet of such conduit, means for indicating the superatmospheric pressure at the outlet of said conduit, the outlet of said conduit being connected to the contact plate adapted to be maintained in contact with the surface to be tested in such a way that the gas in escaping from said conduit must pass between the smooth surface of said plate and the surface to be tested, and means for indicating the relative resistance value of said aerodynamic resistance.

4. A rugosimeter comprising a conduit, a contact plate, an adjustable valve within said conduit, said valve being adapted to offer a continuously adjustable resistance to the flow of gas through said conduit, said valve being provided with means for indicating the relative opening of the valve, means for supplying air at a known constant superatmospheric pressure to the inlet of said conduit, means for indicating the superatmospheric pressure at the outlet of said conduit, the outlet of said conduit being connected to the contact plate adapted to be maintained in contact with the surface to be tested so that the gas in escaping from said conduit must pass between the smooth surface of said plate and the surface to be tested.

MELVIN MOONEY.

REFERENCES CITED

The following references are of record in the file of this patent:

UNITED STATES PATENTS

| Number | Name | Date |
|---|---|---|
| 1,901,966 | Hoffman et al. | Mar. 21, 1933 |
| 1,982,528 | Mennesson | Nov. 27, 1934 |
| 2,139,282 | Pook et al. | Dec. 6, 1938 |
| 2,348,985 | Lewis | May 16, 1944 |